Jan. 9, 1951 F. ALWARD 2,537,117
INTERNAL-COMBUSTION ENGINE
Filed Sept. 23, 1948
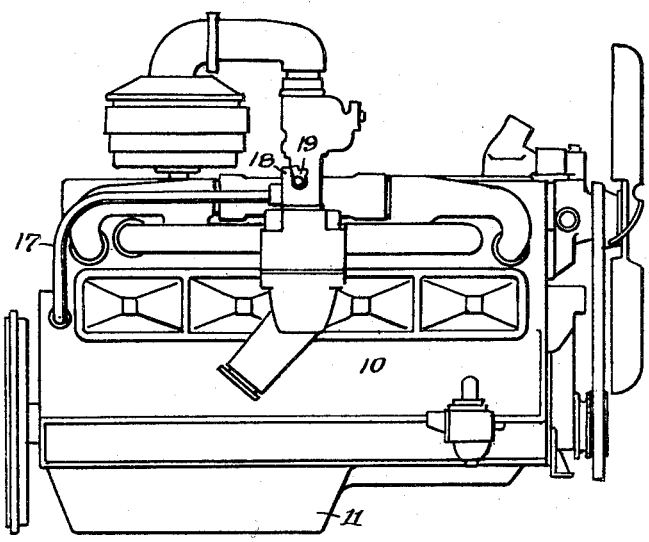
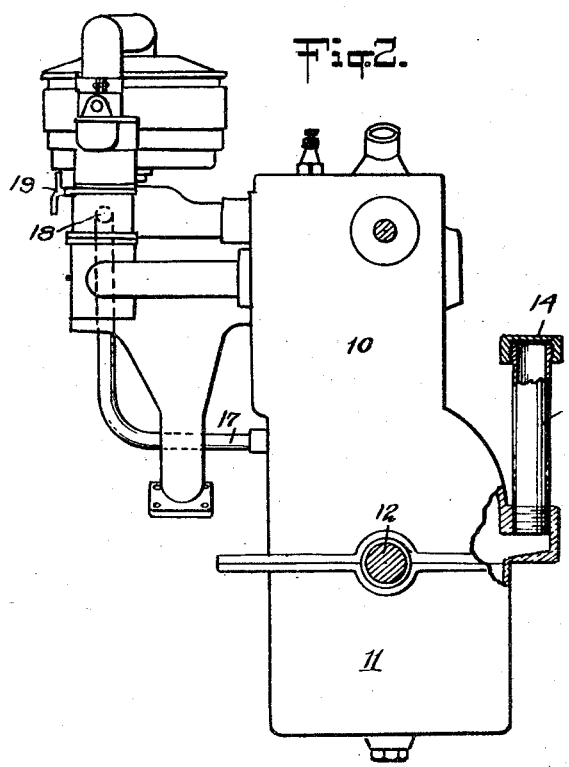
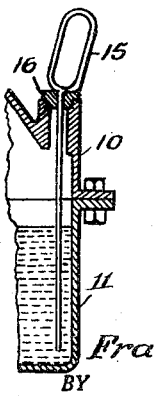
INVENTOR.
Francis Alward
BY
Munn, Liddy & Glaccum
Attorneys Patented Jan. 9, 1951

2,537,117

UNITED STATES PATENT OFFICE 2,537,117

INTERNAL-COMBUSTION ENGINE

Francis Alward, Cambridge, Mass., assignor to John Babcock Howard, Lynn, Mass., trustee Application September 23, 1948, Serial No. 50,802

3 Claims. (Cl. 123—119)

This invention relates to new and useful improvements in internal combustion engines, and especially it relates to means for reducing consumption of crankcase oil by the establishment of a controlled vacuum in the crankcase.

A main object of the invention is to minimize the formation of "sludge" in the crankcase; to minimize condensation in the crankcase of water resulting from differences in crankcase combustion chamber temperatures; to establish a vacuum in the crankcase substantially equal to the vacuum formed in the combustion chambers whereby to prevent the suction of oil past the piston rings into the combustion chamber; to prevent oil leaks at various points including front and rear bearing journals; to remove from the crankcase, as vapors, harmful fluids such as water, since the vacuum created in the crankcase at normal temperatures will cause the water to boil and be drawn off; to remove gases which "blow by" the pistons before they can contaminate the crankcase oil.

Further and more specific objects, features, and advantages will more clearly appear from a consideration of the detailed specification hereinafter set forth especially when taken in connection with the accompanying drawings which illustrate a present preferred form which the invention may assume and which form part of the specification.

Briefly and generally considered, the invention, which is extremely simple, involves hermetically sealing off the crankcase and then connecting it by a pipe or similar connection to the intake passage of the engine, preferably between the combustion chamber and the throttle valve so that during, the operation of the engine, the crankcase is subjected to a "sucking" action to establish therein a substantially steady degree of vacuum under conditions which permit no entrance of air into the crankcase.

According to the accepted and standard practice of "ventilating" entire combustion engine crankcases, there are provided a combination filler and breather pipe through which the oil is generally passed into the crankcase with a screen cap on the top. Generally, another breather pipe extends downward from the engine and is shaped in such manner that the forward motion of the car will cause air to be drawn through the crankcase. It has also been customary to establish a connection between the crankcase and the intake manifold in order to draw off fumes and vapor, but in this instance, the provision related only to the ventilation of the crankcase and was constructed to permit the flow of air therethrough.

In the automotive industry, we have encountered difficulty in the formation of "sludge" caused by unburned fuel, partially burned fuel, and carbon which "blows by" the piston from the combustion chamber. Water of condensation also collects due to differences in crankcase and combustion chamber temperatures. All these difficulties mixed with the oil in the crankcase create "sludge" which lodges behind the piston rings, clogs up oil bores and interferes with valve actions. A great deal of money has been spent and much research and experimental work has been expended to determine the cause of "sludge" and devise ways and means of eliminating it.

After many years of experience with these difficulties, I have conceived of the idea that definite advantages would result from what I call "vacuum suspension" of the pistons; in other words, by placing a vacuum on the crankcase that would balance as nearly as possible the vacuum in a manifold and consequently, the vacuum in the combustion chamber.

The preferred form of the invention is shown in the drawings of which:

Fig. 1 is a side view of a form of engine which might be employed;

Fig. 2 is viewed in parts of sections; and

Fig. 3 is a section viewed through the portion where the oil bayonet stick is located.

Referring now merely to the specific form of the invention shown in the drawings, the cylinder block 10 has connected to its bottom the usual oil pan 11. The engine shaft 12 is shown and extends through the engine casing at both the front and the rear. Filler or breather pipe 13 is supplied through which crankcase oil is introduced. In accordance with the present invention, this pipe is supplied with the screw cap 14, which is tight fitting, to seal the pipe when the cap is applied. The pan 11 is also provided with the usual packing rings and gaskets disposed between it and the cylinder block and disposed between it, the cylinder block, and the drive shaft 12 in a manner not particularly shown in detail, since any one of several detailed ways of sealing the crankcase may be employed. The oil bayonet stick 15 is tightly fitted into a plug 16 so as to seal this connection.

The crankcase is connected by a pipe 17 which extends from an upper part thereof to a point on the intake pipe of the engine indicated as 18, which is disposed between the combustion chamber and the throttle valve 19 and, therefore, the creation of any degree of vacuum, as in the piston chambers, will likewise cause the establishment of a substantially similar degree of vacuum in the crankcase without permitting the admission into the crankcase of any air, so that with the crankcase sealed as mentioned, the operation of the engine will cause the establishment of a "sucking" connection to the crankcase, which will pull vapors therefrom into the intake manifold and thereby, will dissipate them through the tail pipe of the engine.

This means that when the engine is running there will be no flow of air or ventilation of the crankcase, but rather, there will be maintained in the crankcase, a constant vacuum offset only by those gases which might "blow by" or leak by the pistons or seep in through the main bearing journals.

From the above, it will be seen that this simple arrangement is entirely different from any of the well known and "so called" ventilating systems for crankcase.

While I have shown and described what I believe to be the most practical application of my invention, the vacuum may be maintained in the crankcase by means of a pump. This would be particularly true in the case of Diesel or compression ignition engines where no vacuum is normally produced by the motor.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention, is:

1. The combination with an internal combustion engine having a crankcase and an intake provided with a throttle valve therein, of means for sealing the crankcase from atmosphere, and an unrestricted conduit extending directly from the crankcase to the intake at a point between the combustion chamber of the engine and the valve, the crankcase and the intake being under all operating conditions in direct communication to maintain the crankcase at substantially the same negative pressure as the intake.

2. The combination with an internal combustion engine having a crankcase and an intake provided with a throttle valve therein, of means for sealing the crankcase from atmosphere, and an unrestricted conduit extending directly from the crankcase at a point above the liquid level therein to the intake at a point between the combustion chamber of the engine and the throttle valve, the crankcase and the intake being under all operating conditions in direct communication to maintain the crankcase at substantially the same negative pressure as the intake.

3. The combination with an internal combustion engine having a crankcase and an intake provided with a throttle valve therein, of an unrestricted conduit directly extending from the crankcase at a point above the liquid level therein to the intake at a point between the combustion chamber of the engine and the throttle valve, the crankcase having an oil pan sealed in place and a filler pipe with a sealed closure cap thereon, the crankcase and the intake being under all operating conditions in direct communication whereby the suction of the pistons through the intake will create a substantial suction in the crankcase without the admission of any substantial amounts of air into or through the case.

FRANCIS ALWARD.

REFERENCES CITED

The following references are of record in the file of this patent:

UNITED STATES PATENTS

| Number | Name | Date |
|---|---|---|
| 1,279,466 | Smidt | Sept. 17, 1918 |
| 1,415,060 | Skinner | May 9, 1922 |
| 1,542,665 | Calhoun et al. | June 16, 1925 |